UNITED STATES PATENT OFFICE.

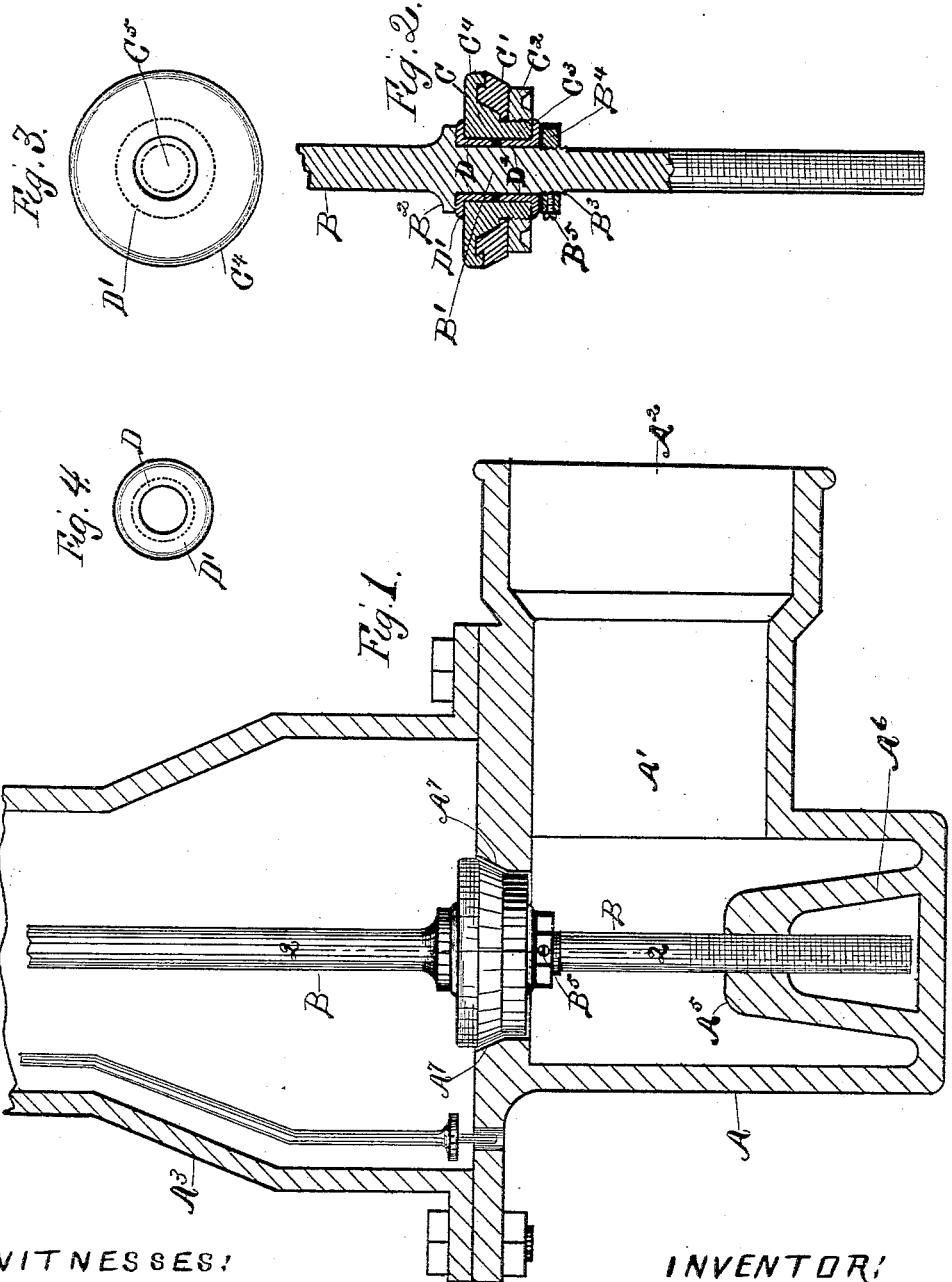

WILLIAM H. BOOTMAN, OF WATERFORD, ASSIGNOR TO JOHN KNICKERBACKER, OF TROY, NEW YORK.

HYDRANT.

SPECIFICATION forming part of Letters Patent No. 504,662, dated September 5, 1893.

Application filed November 30, 1889. Serial No. 332,085. (No model.)

*To all whom it may concern:*

Be it known that I, WILLIAM H. BOOTMAN, a resident of Waterford, in the county of Saratoga and State of New York, have invented certain new and useful Improvements in Hydrants; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in hydrants, and consists of the novel construction and combination of parts hereinafter described and subsequently claimed.

Figure 1 of the drawings, is a central vertical section of the bottom casting of a hydrant, and a portion of the stand pipe attached, and showing the valve, and a portion of the valve stem in side elevation. Fig. 2 is central vertical section of the valve, and a portion of the stem taken on the broken line 2—2 in Fig. 1. Fig. 3 is a top plan view of the valve plug or casting, detached, the position of the upper bushing being shown by dotted lines. Fig. 4 is a top plan view of the upper bushing detached.

A— is the bottom casting, having the usual passage way A'— and inlet A²—, to which is bolted a stand-pipe A³— which may be of any known form of stand-pipe, and provided with the drip valve A⁴— which may also be of any known form. An interiorly-threaded stem-nut A⁵— is supported by a frustro-conical wall A⁶— secured to or integral with the lower part of the casting, as shown in Fig. 1. The valve-stem B— is threaded at its lower end to fit the interiorly threaded nut, and is adapted to be turned therein to raise and lower the stem. The valve is composed of a plug or casting C— surrounded by a ring C'— preferably made of vulcanized rubber and forming the valve proper, adapted to engage with the annular valve-seat A⁷—. The ring C'— is held in place upon the plug, by the interiorly threaded ring C²— fitting and screwed onto the exteriorly threaded boss C³— on the plug, the latter ring forcing the former firmly against the annular flange C⁴— on the plug.

D— is the bushing forced in at the upper end of a central aperture C⁵— which aperture extends through the plug. The bushing is provided with an annular flange D' on its upper end which projects out over the plug, as shown in Fig. 2. A similar bushing D²— is inserted within the lower end of aperture C⁵—.

The valve-stem is provided with an enlarged portion or boss B'— located intermediately of its upper and lower ends, which boss is provided on its upper part, with a collar B²— and on its lower part with screw threads B³— adapted to fit a threaded nut B⁴—. The lower screw-threaded end of the stem is inserted through the bushed valve until the collar B²— bears upon the bushing-flange D'— and the nut B⁴— turned onto the threaded part B³— until it bears lightly upon the flange of the lower bushing which holds the valve in its proper position, vertically, upon the stem, but leaves the stem free to turn in the valve.

The valve-stem is provided at its upper end, (not shown) with some well known means for imparting rotary movements thereto. The lower or screw-threaded end of the stem is inserted in the stem nut and turned down until the collar B²— forces the valve down to its seat as shown in Fig. 1 to close it. To open the valve, the stem is turned in the opposite direction, which causes it to rise out of the stem nut, and the nut B⁴— to strike the lower side of the valve and open it.

It is obvious that the valve, being loose on the stem, is not turned when in engagement with its seat, thereby permitting the use of rubber or other soft pliable substance, which makes a tight durable joint, but which would be soon worn out and rendered worthless, if subjected to sliding friction under pressure. As soon as the valve strikes its seat, it ceases to turn with the stem, and the collar B²— turns upon the bushing-flange D'— and through the latter forces the valve tightly to its seat; at the same time pressing so tightly upon the flange as to make a water-tight joint between the collar and flange, thus enabling me to dispense with the use of a stuffing box or packing, and use a rubber valve. It is only necessary to make the engaging faces of the collar and flange smooth, and cause them to occupy a common plane, when in contact, which may be done in any well known manner, as by grinding the surfaces together.

The nut $B^4$— may be adjustably secured upon the threaded part of the enlarged portion of the valve-stem by means of a set-screw $B^5$—.

It is obvious that the bushing D and its flange may be dispensed with when desired, the stem-collar having its seat upon that portion of the plug surrounding the central aperture $C^5$—, in which case the metallic plug, C—, with flange $C^4$—, becomes the bushing.

What I claim as new, and desire to secure by Letters Patent, is—

1. In a hydrant, the combination with an elastic cushion having a central aperture, of a flanged metallic bushing secured within such aperture, a stem-collar seat surrounding the bushing-aperture on its flanged end, a valve-stem loosely fitting and rotary in the bushing, a collar fixed upon the stem and adapted to engage the collar-seat on the bushing, means for loosely securing the bushing longitudinally of the stem, and a valve-operating stem-nut, substantially as described.

2. In a hydrant, a valve plug C— having flange $C^4$— central aperture $C^5$— and threaded boss $C^3$—, a rubber ring $C'$—, a follower-ring $C^2$—, an upper bushing-flange $D'$—; in combination with a threaded valve-stem B—, a collar $B^2$ fixed on such stem, an enlarged portion $B'$— loosely fitting within the bushing and screw-threaded on its lower part, an adjustable nut $B^4$— fitting such threaded portion, and stem-nut $A^5$— fixed to the bottom of the hydrant, substantially as described.

In testimony whereof I have hereunto set my hand this 27th day of November, 1889.

WILLIAM H. BOOTMAN.

Witnesses:
GEO. A. MOSHER,
FRANK C. CURTIS.